United States Patent [19]

Hoover

[11] 4,339,022
[45] Jul. 13, 1982

[54] FILM WRAPPING DISPENSER HAVING A FLUID PRESSURE ACTUATED, CONTROLLED DRAG SHAFT

[76] Inventor: Lawrence Hoover, 2074 Sunset Point Rd., Unit 131, Clearwater, Fla. 33515

[21] Appl. No.: 51,866

[22] Filed: Jun. 25, 1979

[51] Int. Cl.³ .............................................. F16D 13/76
[52] U.S. Cl. ............................... 192/14; 192/85 AT; 192/88 R; 192/88 B; 242/72 B; 242/75.4
[58] Field of Search ...................... 192/88 B, 88 R, 14, 192/85 AT; 242/72 B, 75.4

[56] References Cited

U.S. PATENT DOCUMENTS

| | | | |
|---|---|---|---|
| 2,621,867 | 12/1952 | Grettve | 242/72 B |
| 3,166,335 | 1/1965 | Mason | 242/72 B X |
| 4,102,513 | 7/1978 | Guard | 242/75.4 |

FOREIGN PATENT DOCUMENTS

| | | | |
|---|---|---|---|
| 44968 | 12/1931 | Denmark | 242/72 B |
| 1047002 | 1/1956 | Fed. Rep. of Germany | 242/72 B |
| 23183 | 6/1930 | Netherlands | 242/72 B |

*Primary Examiner*—H. Hampton Hunter
*Attorney, Agent, or Firm*—Stanley M. Miller

[57] ABSTRACT

A film wrapping dispenser having a fluid pressure actuated, controlled drag shaft is disclosed. It comprises a cylindrical, hollow tube wall which is formed of an extensible material which envelopes a fluid pressure-tight cavity. The tube wall rotatably engages an inner cylindrical bearing surface of a relatively rotating member. A controllable fluid pressure source is connected to the tube for selectively applying fluid pressure within the cavity to radially expand the tube wall. This enables the selective frictional engagement of the tube wall with the inner cylindrical surface of the member. The pressure source may be a bellows shaped as a handle which is integrally formed with the tube wall on one end of the cylinder. The tube and bellows may be precharged with a fluid pressure of sufficient magnitude to impart a relatively low degree of frictional engagement when the bellows is relaxed and to provide a relatively high degree of frictional engagement when the bellows is compressed. The device finds particular use as a film wrapping dispenser for improved manual control of the film tension while wrapping containers on a pallet, for example. A roll of plastic wrap webbing is rotatably mounted on the shaft and the operator, by grasping the handles on the ends of the shaft, can controllably dispense the webbing and controllably tension the webbing during the wrapping operation by selectively squeezing the bellows handle.

8 Claims, 7 Drawing Figures

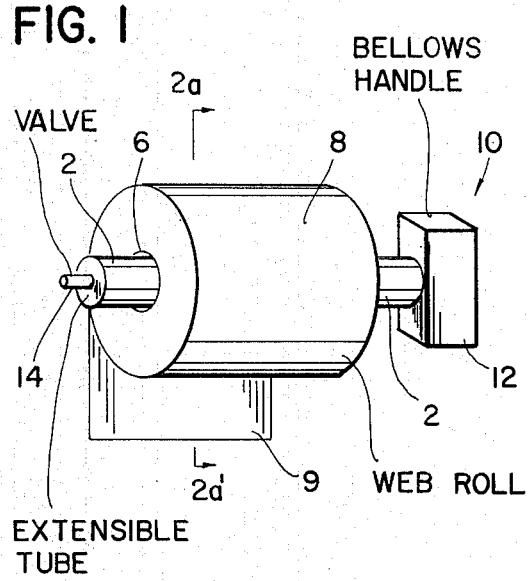
FIG. 1
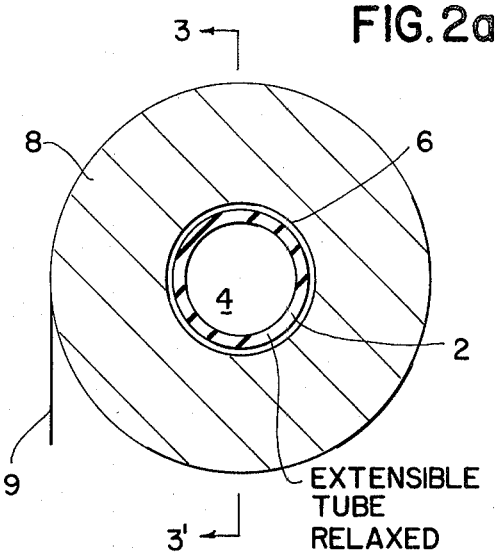
FIG. 2a
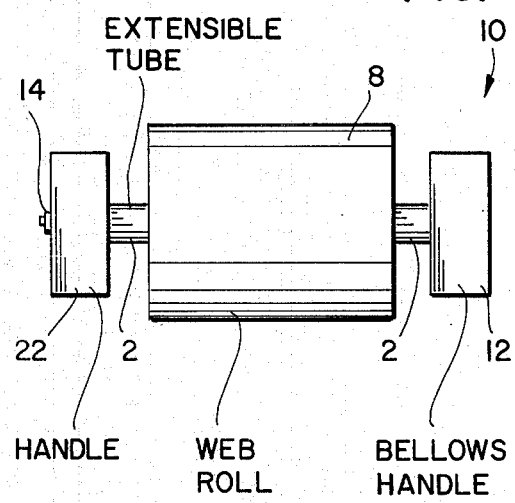
FIG. 4
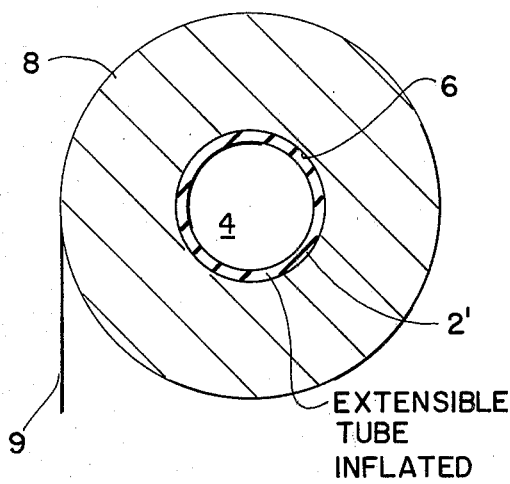
FIG. 2b
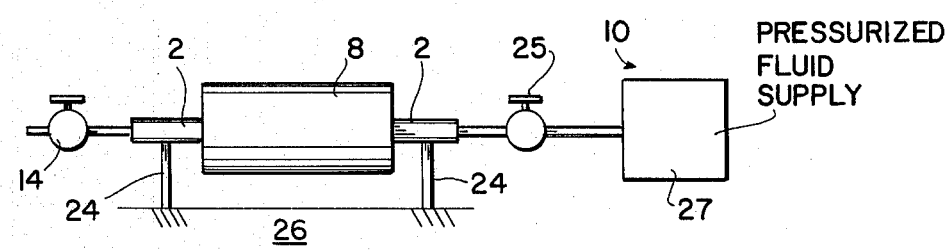
FIG. 5 BRAKE
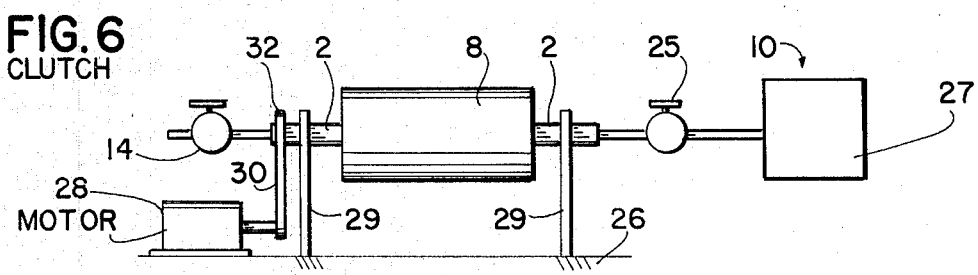
FIG. 6 CLUTCH 4,339,022

FILM WRAPPING DISPENSER HAVING A FLUID PRESSURE ACTUATED, CONTROLLED DRAG SHAFT

FIELD OF THE INVENTION

The invention disclosed broadly relates to extensible apparatus and more particularly relates to a fluid pressure actuated, controlled drag shaft.

BACKGROUND OF THE INVENTION

Friction brakes and clutches in the prior art depend upon a relatively complex assemblage of interrelated elements to carry out the transfer of rotary motion or the retardation of rotary motion between objects undergoing relative rotation. Typically, a drag brake will comprise a drum and shoe combination of elements wherein the shoe is actuated to expand against the drum by means of a series of hydraulic and mechanical links. Clutches typically comprise a pair of opposed face plates which are spring loaded into contact and, when actuated, are caused to separate, thereby interrupting the transfer of rotary motion. It is difficult to apply these prior art braking and clutching principles to produce a low cost, miniature brake or clutch, especially one which should be economically disposable after use. In particular, prior art film wrapping dispensers, as disclosed for example in U.S. Pat. No. 4,102,513, have required relatively complex and expensive drag brake mechanisms to achieve the desired control of film tension during the wrapping operation.

OBJECTS OF THE INVENTION

It is therefore an object of the invention to provide an improved drag brake.

It is yet another object of the invention to provide an improved drag brake having a fewer number of parts than has been available in the prior art.

It is yet a further object of the invention to provide an improved drag brake which is cheaper to manufacture and easier to operate than has been available in the prior art.

It is yet a further object of the invention to provide an improved clutch.

It is still another object of the invention to provide an improved clutch having fewer parts and being less expensive to manufacture, than has been available in the prior art.

It is still a further object of the invention to provide an improved film wrapping dispenser having a simpler, lower cost drag brake mechanism than has been available in the prior art.

SUMMARY OF THE INVENTION

These and other objects, features and advantages of the invention are accomplished by the fluid pressure actuated, controlled drag shaft, disclosed herein. It comprises a cylindrical, hollow tube wall which is formed of an extensible material which envelopes a fluid pressure-tight cavity. The tube wall rotatably engages an inner cylindrical bearing surface of a relatively rotating member. A controllable fluid pressure source is connected to the tube for selectively applying fluid pressure within the cavity to radially expand the tube wall. This enables the selective frictional engagement of the tube wall with the inner cylindrical surface of the member. The pressure source may be a bellows shaped as a handle which is integrally formed with the tube wall on one end of the cylinder. The tube and bellows may be precharged with a fluid pressure of sufficient magnitude to impart a relatively low degree of frictional engagement when the bellows is relaxed and to provide a relatively high degree of frictional engagement when the bellows is compressed. The device finds particular use as a film wrapping dispenser for improved manual control of the film tension while wrapping containers on a pallet, for example. A roll of plastic wrap webbing is rotatably mounted on the shaft and the operator, by grasping the handles on the ends of the shaft, can controllably dispense the webbing and controllably tension the webbing during the wrapping operation by selectively squeezing the bellows handle.

DESCRIPTION OF THE FIGURES

These and other objects, features and advantages of the invention will be more fully appreciated with reference to the accompanying figures.

FIG. 1 is an isometric view of the fluid pressure actuated, controlled drag shaft invention.

FIG. 2a is a cross-sectional view along the section line 2a—2a' of FIG. 1, showing the tube 2 in its relaxed state.

FIG. 2b is a cross-sectional view of the device of FIG. 2a, showing the tube 2' in its inflated state.

FIG. 3 is a cross-sectional view along the section lines 3—3' of FIG. 2a.

FIG. 4 is a side view of an alternate embodiment of the invention.

FIG. 5 is a schematic view of an application of the invention as a brake.

FIG. 6 is a schematic view of an alternate embodiment of the invention in its application as a clutch.

DISCUSSION OF THE PREFERRED EMBODIMENT

Figure 3:
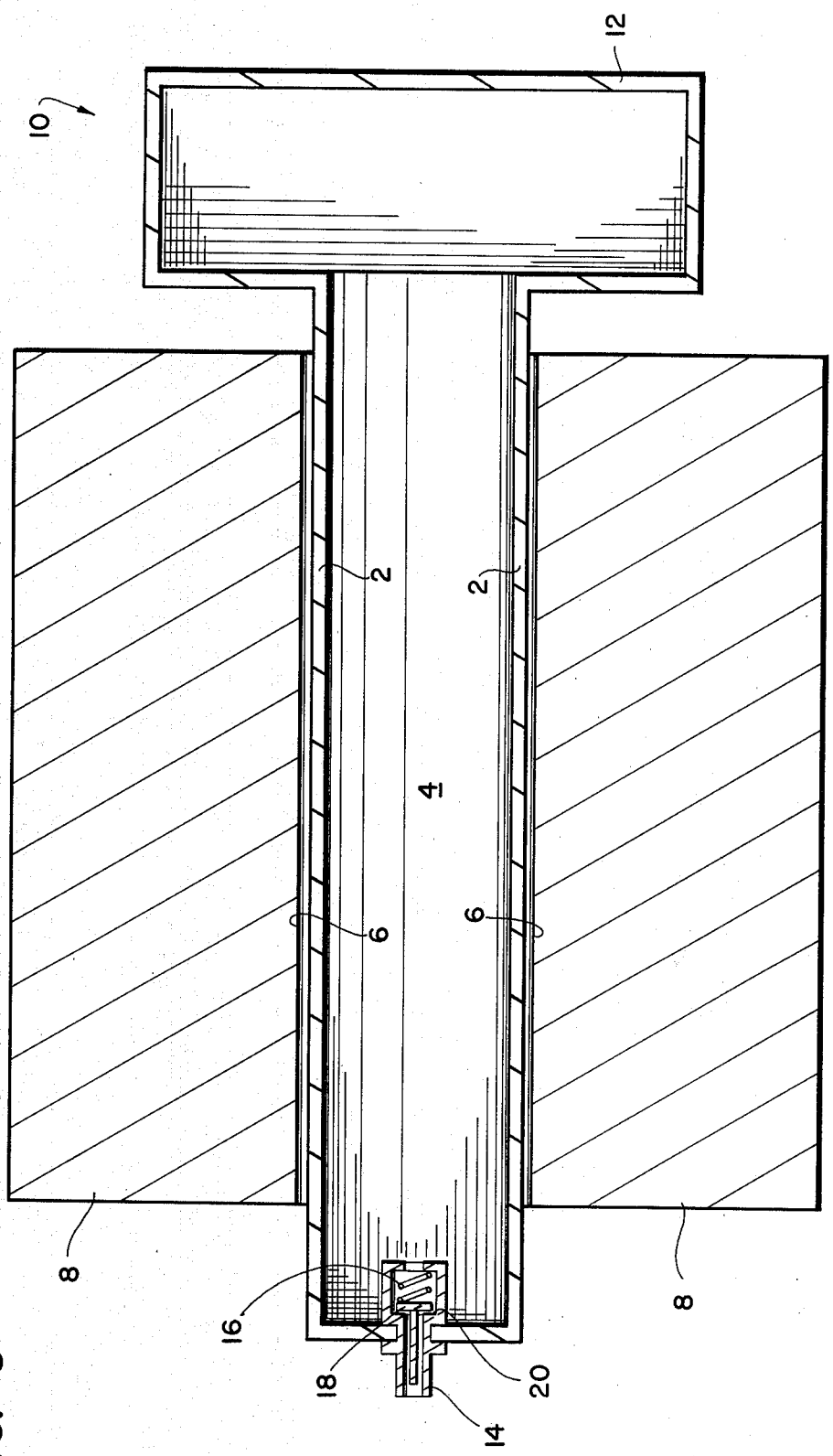

A fluid pressure actuated, controlled drag shaft is disclosed. It comprises a cylindrical, hollow tube wall which is formed of an extensible material which envelopes a fluid pressure-tight cavity. The tube wall rotatably engages an inner cylindrical bearing surface of a relatively rotating member. A controllable fluid pressure source is connected to the tube for selectively applying fluid pressure within the cavity to radially expand the tube wall. This enables the selective frictional engagement of the tube wall with the inner cylindrical surface of the member. The pressure source may be a bellows shaped as a handle which is integrally formed with the tube wall on one end of the cylinder. The tube and bellows may be precharged with a fluid pressure of sufficient magnitude to impart a relatively low degree of frictional engagement when the bellows is relaxed and to provide a relatively high degree of frictional engagement when the bellows is compressed. The device finds particular use as a film wrapping dispenser for improved manual control of the film tension while wrapping containers on a pallet, for example. A roll of plastic wrap webbing is rotatably mounted on the shaft and the operator, by grasping the handles on the ends of the shaft, can controllably dispense the webbing and controllably tension the webbing during the wrapping operation by selectively squeezing the bellows handle.

Turning now to FIG. 1, there is shown in an isometric view, the fluid pressure actuated, controlled drag shaft invention. A cylindrical, hollow tube wall 2 is formed of an extensible material. The material may be an elastic rubber or plastic material such as butyl rubber or polyurethane plastic. The mechanical properties of the material must be such that it is readily extensible when inflated with a fluid and yet is rigid enough to undergo the shear forces necessary in its application as a film wrapping dispenser. The hollow tube wall 2 envelopes a fluid pressure-tight cavity 4. The cylindrical, hollow tube wall 2 rotatably engages an inner cylindrical bearing surface 6 of a relatively rotating member 8, such as a roll of plastic wrap webbing.

The fluid pressure actuated, controlled drag shaft shown in FIG. 1 also includes a controllable fluid pressure source 10 which is connected to the tube 2 for selectively applying fluid pressure within the cavity 4. The tube 2 is shown in cross-section in FIG. 2a with the extensible hollow tube wall 2 in its relaxed state. FIG. 2b shows a cross-sectional view of the tube of FIG. 2a when the tube 2 has been inflated by means of the controllable fluid pressure source 10. When fluid pressure is selectively applied to the cavity 4 by means of the controllable fluid pressure source 10, the tube wall 2 shown in FIG. 2a is radially expanded as is shown in FIG. 2b and frictionally engages the inner cylindrical surface 6 of the member 8. This selective frictional engagement is responsive to selectively applying the fluid pressure by means of the controllable fluid pressure source 10.

The pressure source 10 may be a pneumatic pressure source which selectively applies a pneumatic pressure, such as air pressure, to the cavity 4. Alternately, the pressure source 10 may be a hydraulic pressure source which selectively applies hydraulic pressure, such as water pressure, to the cavity 4.

As may be seen in FIGS. 1, 3 and 4, the pressure source 10, in its preferred embodiment, is a resilient bellows 12 which is shaped as a handle and which is integrally formed with the tube wall 2 on one end of the cylinder. The process for manufacturing the article may include a spin casting or blow molding of a suitable rubber or plastic material into a mold so as to form, in a single operation, a unitary part which includes the bellows portion 12 and the connected tube portion 2.

The tube 2 and bellows 12 may be precharged with a fluid pressure such as with air at the time of manufacture or at the time of use, to a sufficient magnitude so as to impart a relatively low degree of frictional engagement as is shown in FIG. 2a, when the bellows 12 is relaxed. In this manner, when the bellows 12 is grasped and manually compressed, the increased fluid pressure within the cavity 4 expands the tube wall 2, as shown in FIG. 2b, contacting the inner surface 6 of the web roll 8, so that a relatively high degree of frictional engagement is imparted between the tube 2 and the inner bearing surface 6 of the roll member 8.

A conventional valve 14 may optionally be mounted in the tube wall as is shown in FIG. 3. The valve 14 may be attached to an auxiliary pressure source for precharging the tube 2 and the bellows 12, as was discussed above. The valve 14 is of a conventional structure and includes a compression spring 16 which presses a valve portion 18 against the valve seat 20 so as to maintain a sustained fluid pressure within the cavity 4. The pressure of the fluid within the cavity 4 may be released by mechanically actuating the valve member 18 in the conventional manner.

In the embodiment shown in FIGS. 1 and 3, the operator may grasp the bellows handle 12 with one hand and the opposite end of the tube 2 with the other hand, when using the device as a manual, film wrapping dispenser. FIG. 4 shows an alternate embodiment wherein a second handle 22 is mounted on the tube wall 2 on the end of the cylinder opposite to the bellows 12. With this alternate embodiment, the operator may grasp both ends of the device, with one hand grasping the bellows handle 12 and the other hand grasping the second handle 22. In the operation of wrapping a plastic wrap web around a stack of palletized boxes, for example, the webbing 9 is selectively tensioned by means of the operator selectively increasing the pressure of the fluid within the cavity 4 by manually squeezing the bellows handle 12 while, at the same time pulling on both the bellows handle 12 and the handle 22 so as to wrap the palletized boxes in the desired manner.

FIG. 5 shows an alternate embodiment of the invention wherein the tube wall 2 is rigidly mounted by means of the piers 24 to the stationary platform 26. The roll member 8 may be undergoing rotation, as for example when a webbing is playing off the roll 8. The fluid pressure actuated, controlled drag shaft may then be operated as a brake to brake the rotary motion of the member 8 by closing the valve 14 and opening the valve 25 which connects the cavity 4 to a pressurized fluid supply 27, so that the extensible tube 2 expands and frictionally engages the roll 8 as was described above.

FIG. 6 shows still another alternate embodiment of the invention wherein a rotary drive means 28 such as an electric motor, is operatively connected to the extensible tube 2 by means of the drive belt 30 and pulley 32 which is mounted to the tube 2. The tube 2 is rotatably mounted on the piers 29 anchored to the platform 26. The motor 28 rotates the tube 2 about its cylindrical axis. The tube wall 2 may be operated as a clutch for selectively transferring rotary motion from the rotary drive means 28 to the rotary member 8 rotatably mounted on tube 2. This is accomplished by closing off the valve 14 and opening the valve 25 which connects the pressurized fluid supply 27 to the cavity 4 of the tube 2, so that the extensible tube 2 expands and frictionally engages the rotary member 8, as was discussed above.

The resulting improved fluid pressure actuated, controlled drag shaft enables the carrying out of a drag brake function or a rotary motion transmission clutching function by means of an apparatus having a minimum number of parts and having a reduced manufacturing cost. The cost of the fluid pressure actuated, controlled drag shaft device, when it is used as the film wrapping dispenser shown in FIGS. 1–4, enables it to be a disposable item, since its manufacturing cost is so small.

Although several specific embodiments of the invention have been disclosed, it should be understood by those having skill in the art, that changes can be made to the structure, materials, operation and application of the disclosed embodiments without departing from the spirit and the scope of the invention.

What is claimed is:

1. A fluid pressure actuated, manual, film wrapping dispenser, comprising:
   a cylindrical, hollow tube wall formed of an extensible material, enveloping a fluid tight cavity, for rotatably engaging an inner cylindrical bearing surface of a roll of film webbing to be dispensed for wrapping about an object;
   a manually squeezable bellows handle formed of a flexible, extensible material and shaped to be grasped by a human hand, connected to said tube for selectively applying fluid pressure within said cavity to radially expand said tube wall for selective frictional engagement with said inner cylindrical surface of said roll of film, for controllably tensioning said film by manually squeezing said bellows handle while wrapping said object.

2. The apparatus of claim 1, wherein said fluid pressure is a pneumatic pressure.

3. The apparatus of claim 1, wherein said fluid pressure is a hydraulic pressure.

4. The apparatus of claim 1, wherein said bellows shaped handle is integrally formed with said tube wall on one end of said cylinder.

5. The apparatus of claim 4, wherein said tube and bellows are precharged with a fluid pressure of sufficient magnitude to impart a relatively low degree of said frictional engagement when said bellows is relaxed;

whereby a relatively high degree of said frictional engagement is imparted when said bellows is compressed.

6. The apparatus of claim 4, which further comprises:

a valve means mounted in said tube wall for attachment to an auxilliary fluid pressure source for precharging said tube and bellows with a fluid pressure of sufficient magnitude to impart a relatively low degree of said frictional engagement when said bellows is relaxed;

whereby a relatively high degree of said frictional engagement is imparted when said bellows is compressed.

7. The apparatus of claim 4, which further comprises:

a second handle mounted on said tube wall on the end of said cylinder opposite to said bellows.

8. The apparatus of claim 7, which further comprises:

a valve means mounted in said tube wall for attachment to an auxilliary fluid pressure source for precharging said tube and bellows with a fluid pressure of sufficient magnitude to impart a relatively low degree of said frictional engagement when said bellows is relaxed;

whereby a relatively high degree of said frictional engagement is imparted when said bellows is compressed.

* * * * *